US008244462B1

(12) United States Patent
Zhu

(10) Patent No.: US 8,244,462 B1
(45) Date of Patent: Aug. 14, 2012

(54) SYSTEM AND METHOD OF DETERMINING DISTANCES BETWEEN GEOGRAPHIC POSITIONS

(75) Inventor: Jiajun Zhu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 469 days.

(21) Appl. No.: 12/469,937

(22) Filed: May 21, 2009

(51) Int. Cl.
*G01C 21/12* (2006.01)
*G01C 21/10* (2006.01)
(52) U.S. Cl. ...................................................... 701/408
(58) Field of Classification Search .......... 701/207–223, 701/300–302, 400–541
See application file for complete search history.

(56) References Cited

U.S. PATENT DOCUMENTS

2006/0075442 A1* 4/2006 Meadow .......................... 725/91
2006/0259574 A1* 11/2006 Rosenberg ..................... 709/217

OTHER PUBLICATIONS

Gregory D. Abowd, Christopher G. Atkeson, Jason Hong, Sue Long, Rob Kooper and Mike Pinkerton, "Cyberguide: A Mobile Context-Aware Tour Guide", Wireless Networks 3 (1997), pp. 421-433.
Ronald T. Azuma, "A Survey of Augmented Reality" In Presence: Teleoperators and Virtual Environments 6, 4 (Aug. 1997), 355-385, pp. 1-48.

* cited by examiner

*Primary Examiner* — William Allen
(74) *Attorney, Agent, or Firm* — Lerner, David, Littenberg, Krumholz & Mentlik, LLP

(57) ABSTRACT

A system and method is provided of determining geographic positions. In one aspect, a user points the device at first and second positions on the surface of a geographic object. Based on the position of the device, the orientation of the device, and information identifying the geographic position of the surface of the object, a processor determines and displays the distance between the first and second positions.

11 Claims, 18 Drawing Sheets

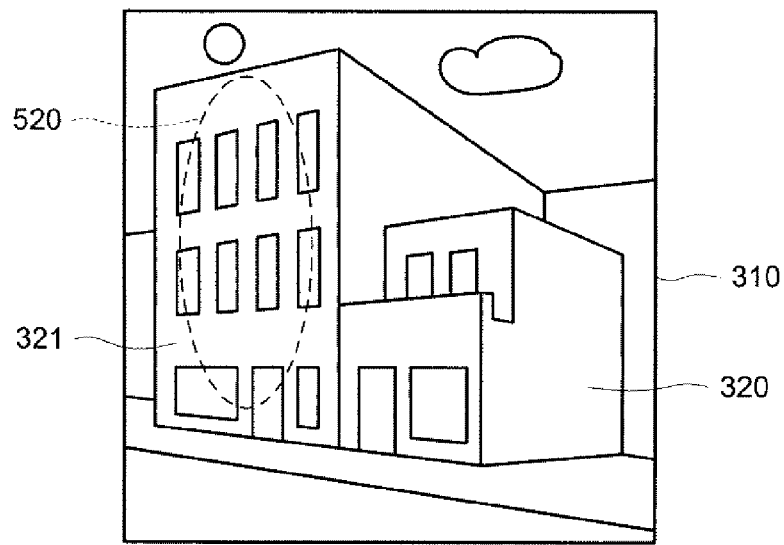
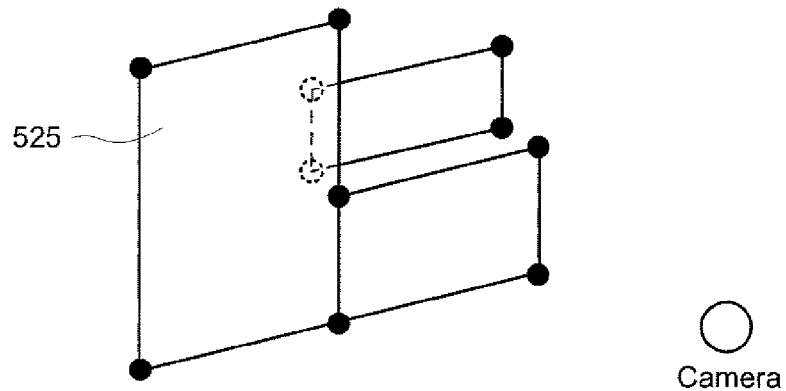
```
Object Position Data
Camera = (Lat₁°, Lon₁°, Alt₁ meters)
Surface 1
• Vertex 1 = (Lat₂°, Lon₂°, Alt₂ meters)
• Vertex 2 = (Lat₃°, Lon₃°, Alt₃ meters)
• Vertex 3 = (Lat₄°, Lon₄°, Alt₄ meters)
• Vertex 4 = (Lat₅°, Lon₅°, Alt₅ meters)
....
Pixel at (xₐ, yₐ)= Surface 1
Pixel at (x_b, y_b)= Surface 2
```
FIGURE 5

SYSTEM AND METHOD OF DETERMINING DISTANCES BETWEEN GEOGRAPHIC POSITIONS

BACKGROUND OF THE INVENTION

A variety of technological systems exist for determining the position geographic objects. For example, cell phones often include GPS receivers and accelerometers to determine their own geographic position and orientation.

Devices also exist for determining the geographic position of other objects. A total station is an optical instrument used in surveying to take measurements of scenes. It is a combination of an electronic theodolite (transit), an electronic distance meter (EDM) and software running on an external computer known as a data collector.

With a total station one may determine angles and distances from the instrument to points to be surveyed. With the aid of trigonometry and triangulation, the angles and distances may be used to calculate the coordinates of actual positions (X, Y, and Z or northing, easting and elevation) of surveyed points, or the position of the instrument from known points, in absolute terms.

The data may be downloaded from the theodolite to an external computer and application software will generate a map of the surveyed area.

BRIEF SUMMARY OF THE INVENTION

In one aspect, a method of determining distances with a device is provided. The method includes receiving object position data representing the position of a surface of a geographic object, determining the first and second geographic position of the device, and determining the first and second geographic orientation of the device. It also includes determining, with a processor, the distance between a first and second position on the surface of the geographic object based on the first geographic position of the device, the second geographic position of the device, the first geographic orientation of the device, the second geographic orientation of the device and the object position data.

In another aspect, a system is provided that includes a position detector providing a position value as output and an orientation detector providing an orientation value as output. The position value represents a position relative to a geographic reference and the orientation value represents an angle relative to the reference. The system also includes an electronic display and a processor in communication with the position detector, orientation detector and electronic display. It also includes instructions executable by the processor, where the instructions comprise: accessing data representing the geographic positions of a plurality of points on the surface of a geographic object; determining a first geographic position, where the first geographic position is determined based on a first position value output by the position detector, a first orientation value output by the orientation detector and the data, and displaying a value associated with the first geographic position.

Yet another aspect relates to a method of using a wireless phone to determine distances. The method includes: receiving first and second position values representative of the geographic position of the wireless phone; receiving first and second orientation values representative of the geographic orientation of the wireless phone; receiving object position data from a server, where the object position data represents the geographic position of a plurality of points on the surface of a geographic object; determining with a processor, first and second geographic positions on the surface based on the intersection of the surface with the first and second lines defined by the first and second positions and the first and second geographic orientations, respectively; determining with a processor, the distance between the first and second geographic positions; and displaying, on an electronic display on the wireless phone, the distance.

BRIEF DESCRIPTION OF THE DRAWINGS

FIG. 5 is a diagram functionally illustrating, in accordance with an aspect of the invention, object position data representing the geographic position of surfaces of geographic objects.

It will be understood that many of the figures are not drawn to scale for ease of understanding.

DETAILED DESCRIPTION

In just one aspect of the system and method, a phone may be used to determine the distance between different positions on the surface of a geographic object such as a building. When the user points the phone at the first position and presses a button, the geographic coordinates of the first position are calculated by the phone's processor based on the phone's geographic position, its geographic orientation, and information identifying the geographic position of a plurality of points on the surface. The second position is similarly calculated, and the distance between the two points are displayed.

Figure 1:
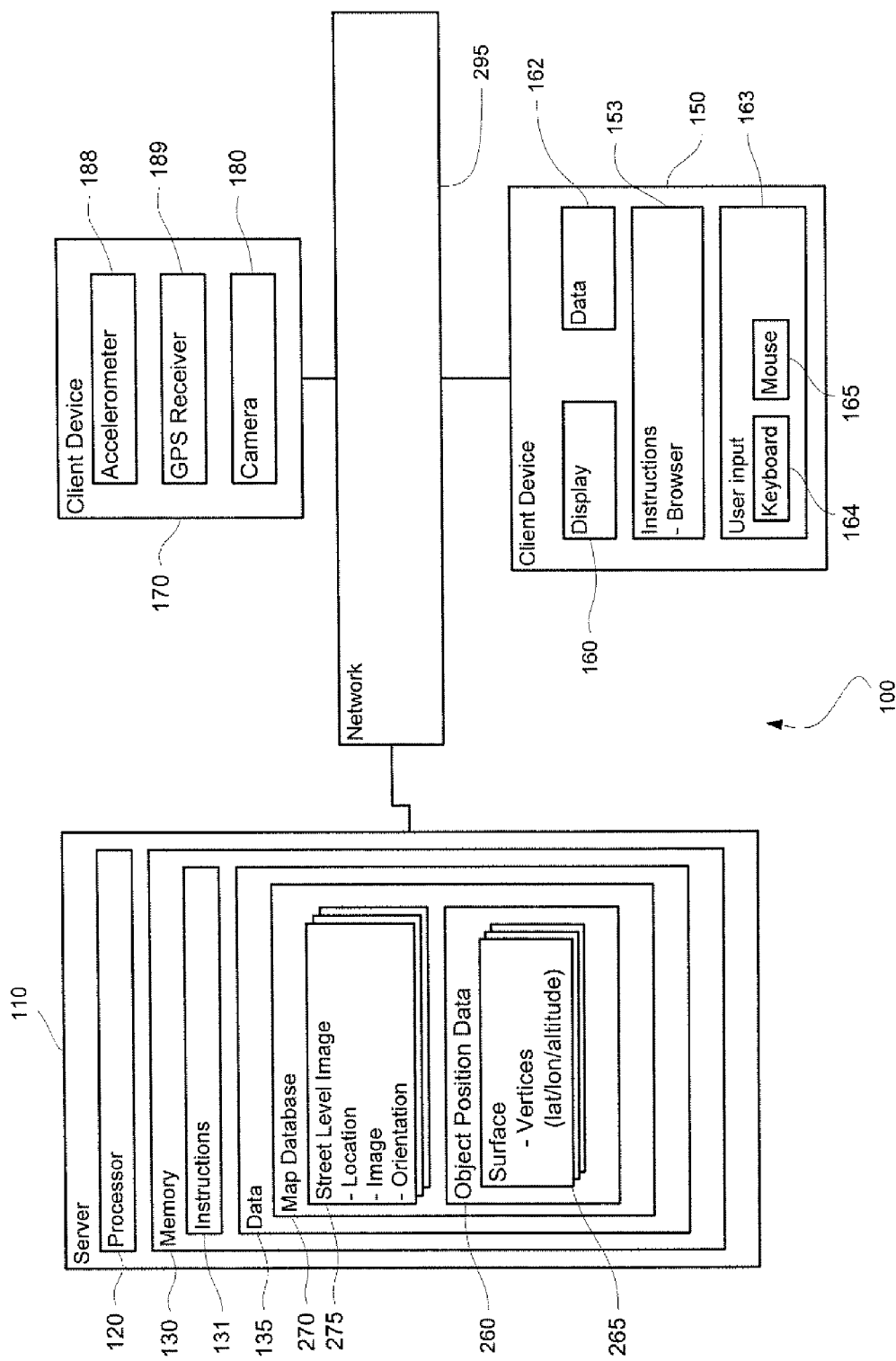
FIG. 1 is a functional diagram of a system in accordance with an aspect of the invention.
Figure 2:
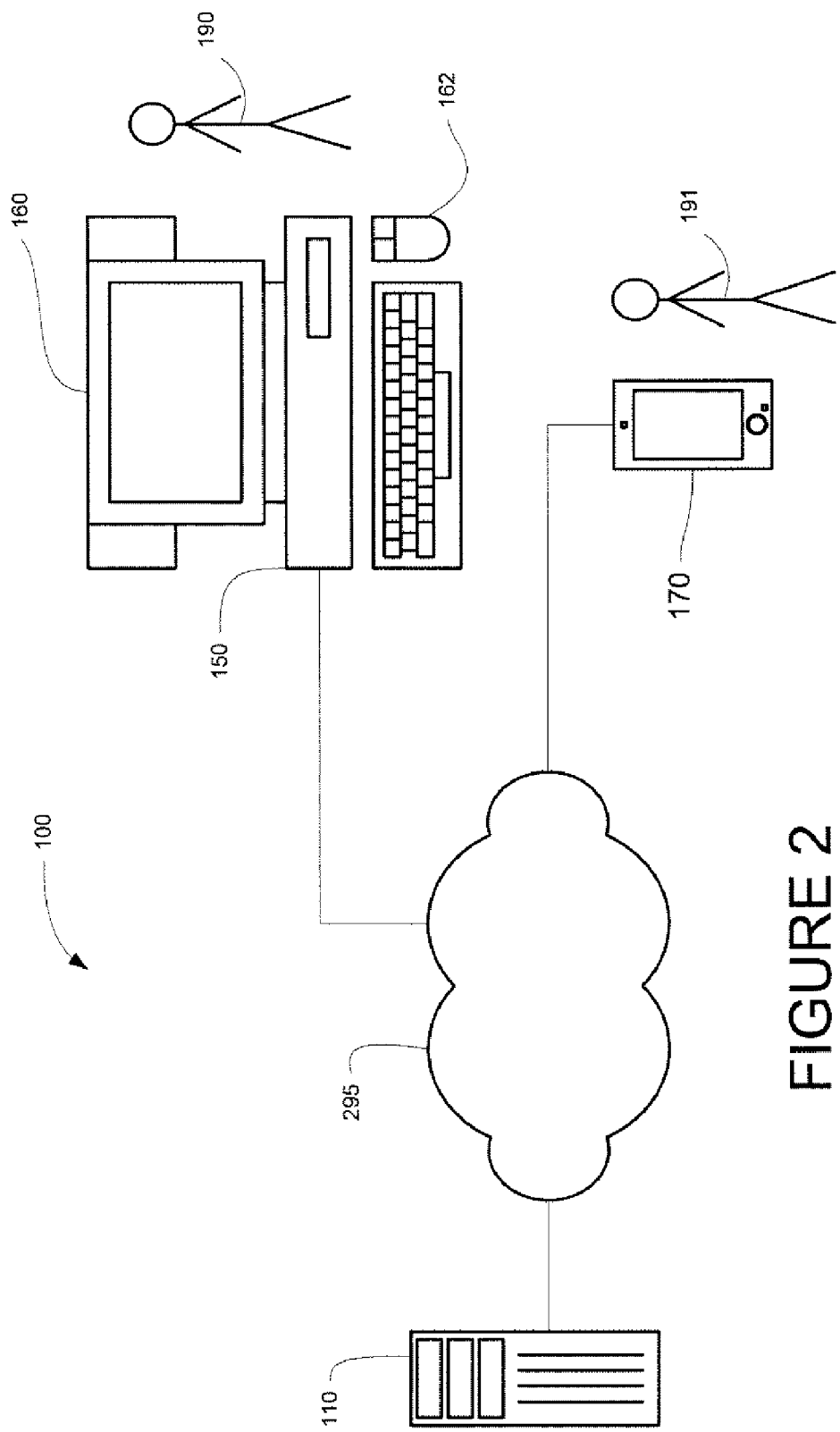
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. It also includes data 135 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or AMD. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 130. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. The data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client devices 150 and 170. For example, computer 110 may be a web server. Each client device may be configured similarly to the server 110, with a processor, memory and instructions. Each client device 150 and 170 may be a personal computer, intended for use by a person 190-191, having all the internal components normally found in a personal computer such as a central processing unit (CPU), display device (for example, a monitor having a screen, a projector, a touch-screen, a small LCD screen, a television, or another device such as an electrical device that is operable to display information processed by the processor), CD-ROM, hard-drive, user input (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions. 191

Although the client devices 150 and 170 may comprise a full-sized personal computer, the system and method may also be used in connection with mobile devices capable of wirelessly exchanging data with a server over a network such as the Internet. For example, a client device 170 may be a wireless-enabled PDA such as a Blackberry phone or an Internet-capable cellular phone. The user may input information using a small keyboard (such as in the case of a Blackberry phone), a keypad (such as in the case of a typical cell phone), a touch screen (in the case of a PDA) or any other user input device.

The server 110 and client devices 150 and 170 are capable of direct and indirect communication, such as over a network 105. Server 110 and client devices 150 and 170 may also be capable of direct and indirect communication with additional computers on the network. Although only a few computers are depicted in FIGS. 1-2, it should be appreciated that a typical system can include a large number of connected computers, with each different computer being at a different node of the network 105. The network, and intervening nodes, may comprise various configurations and protocols including the Internet, World Wide Web, intranets, virtual private networks, wide area networks, local networks, private networks using communication protocols proprietary to one or more companies, Internet relay chat channels (IRC), instant messaging, simple mail transfer protocols (SMTP), Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Figure 3:
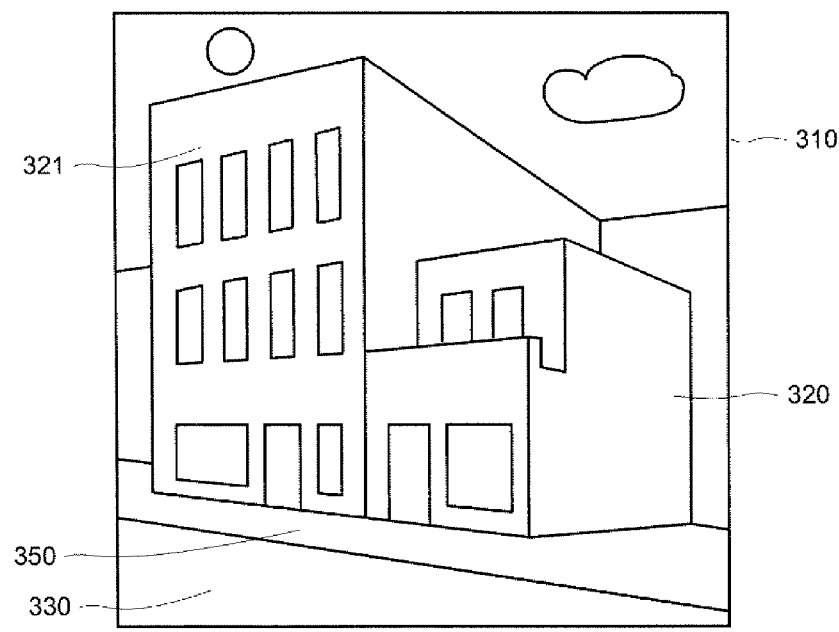
FIG. 3 is a street level image in accordance with an aspect of the invention, captured by a camera.
Figure 4:
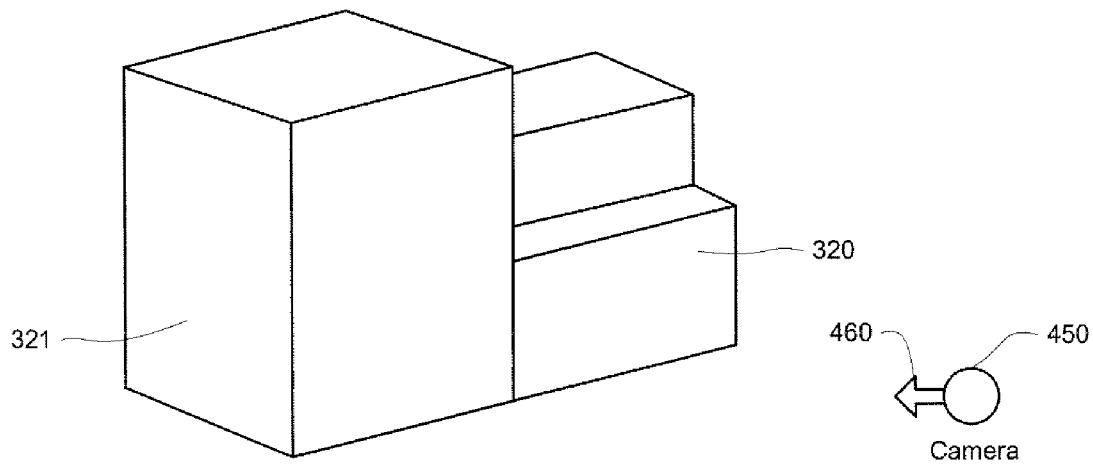
FIG. 4 is a diagram functionally illustrating, in accordance with an aspect of the invention, the relative geographic positions of objects within a street level image and the position and angle of a camera used to capture the street level image.

The map database may also store street level images 275. A street level image is an image of geographic objects that was captured by a camera at an angle generally parallel to the ground. Both the geographic objects in the image and the camera have a geographic location relative to one another. Thus, as shown in FIG. 3, street level image data may represent various geographic objects such as buildings 320-321, sidewalks 320 and street 330. It will be understood that while street level image 310 only shows a few objects for ease of explanation, a typical street level image will contain as many objects associable with geographic locations (street lights, mountains, trees, bodies of water, vehicles, people, etc.) in as much detail as the camera was able to capture. FIG. 4 pictorially illustrates the geographic locations of the buildings 320-21 relative to the geographic position 450 and angle 450 of the camera when the image was captured.

The objects in the street level images may be captured in a variety of different ways. For example, the street level image may be captured by a camera mounted on top of a vehicle, from a camera angle pointing roughly parallel to the ground and from a camera position at or below the legal limit for vehicle heights (e.g., 7-14 feet). (Street level images are not limited to any particular height above the ground; a street level image may be taken from the top of building.) Panoramic street-level images may be created by stitching together a plurality of photographs taken from different camera angles. The camera may be any device capable of capturing optical images of objects including film cameras, digital still cameras, analog video cameras and image sensors (by way of example, CCD, CMOS or other).

In addition to being associated with geographic locations, street level images 275 are typically associated with information indicating the orientation of the image. For example, if the street level image comprises a digital still image, the orientation may simply be the camera angle such as an angle that is 30° east of true north and rises 2° from ground level. If the street level image is a panoramic image, such as a 360° panorama centered at the geographic location associated with the image, the orientation may indicate the portion of the image that corresponds with looking due north from the camera position at an angle directly parallel to the ground.

Street level images may also be stored in the form of videos, such as by displaying MPEG videos captured by an analog video camera or displaying, in succession, time-sequenced photographs that were captured by a digital still camera.

In one aspect, the geographic locations of the surfaces facing the camera that captured the images are stored as polygons. Thus, as shown in FIG. 5, the surface 520 of building 321 may be defined as a polygon 525 having four vertices, each vertex being associated with a different geographic position. The object position data vertices, in turn, may be stored in terms of their latitude, longitude and altitude positions, such as a coordinate of the form ($Lat_2°$, $Lon_2°$, $Alt_2$ meters). In that regard, the surface 520 of building 321 may be stored as a collection of geographic positions ($Lat_2$, $Lon_2$, $Alt_2$), ($Lat_3$, $Lon_3$, $Alt_3$), ($Lat_4$, $Lon_4$, $Alt_4$) and ($Lat_5$, $Lon_5$, $Alt_5$). Thus, the polygon 525 defines the geographic locations of a plurality of points, namely, the points within the bounds of the polygon. The surfaces of other objects may be similarly stored, as well as the position and orientation of the camera that captured the image.

Other formats for storing the object position data may also be used. For example, a separate value may be stored for each pixel of the street level image where the value represents the geographic position of the surface that is illustrated at that pixel. Thus, the pixel at row $y_a$ and column $x_a$ (hereafter, "($x_a$, $y_a$)") of the street level image may represent a portion of the surface of a building at that pixel. One of the values associated with the pixel may be the color and brightness of that portion of the surface as captured by the camera. The other value associated with the pixel may be the geographic position of that portion of the surface. Pixels that are not associated with a surface may be associated with a null or default surface value. In that regard, and similar to the object position data associated with polygons, the object position data may define the geographic position of a plurality of points. In still another aspect, the object position data may store the distances from the objects to the camera at each pixel of the image.

Rather than being associated with absolute values such as latitude/longitude, the values of the object position data may be relative to any geographic reference system and in any scale. In various aspects of the system and method, when a first type of information is used to store the object position data (such as storing the latitude, longitude and altitude of the camera and surface), information of another type may be generated from it (such as calculating the distance between the camera and a surface). For example, if the object position data stores surfaces as a cloud of discrete coordinates, the geographic position of points in between the stored coordinates may be extrapolated from the nearest, neighboring coordinate(s).

Certain formats permit the surface information to be stored independently of the street level images taken by the camera. For example, object position data stored as described in FIG. 5 may be stored without reference to the street level image or camera position. If the object position data for a street level image is required, such object position data may be retrieved by querying those surfaces that are proximate to the street level image's camera position and in front of other surfaces.

A variety of systems and methods may be used to collect the surface information. By way of example only, a laser range finder may be used. In addition, stereoscopic systems employing two cameras, spaced slightly apart yet looking at the same scene, may be used as well; by analyzing the slight differences between the images seen by each camera, it is possible to estimate the distance at each point in the images. In yet another aspect, the information may be compiled by using a single video camera, travelling at a particular velocity, to capture the street level imagery as the scenery passes by. The video may not only be used as the street level image, but subsequent frames may be compared to extract the different distances between the objects and the camera (e.g., mountains in the distance will stay in the frame much longer than a fire hydrant passing by along the street).

Client devices 150 and 170 may include a geographic position detector and geographic orientation detector to determine the geographic position and orientation of the device. For example, client device 170 may include a GPS receiver 189 to determine the device's latitude, longitude and altitude position. The component may also comprise software for determining the position of the device based on other signals received at the client device 170, such as signals received at a cell phone's antenna from one or more cell phone towers if the client device is a cell phone. It may also include an accelerometer 188 or gyroscope to determine the direction in which the device is oriented. By way of example only, the device may determine its pitch, yaw or roll (or changes thereto) relative to the direction of gravity or a plane perpendicular thereto.

Figure 7:
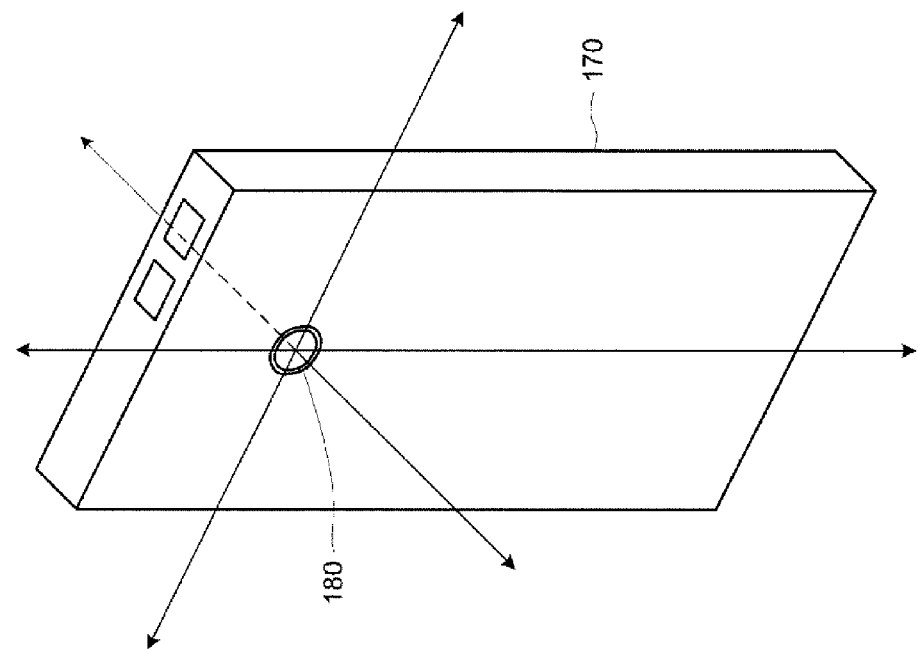
FIG. 7 is a pictorial diagram of the back of a device in accordance with an aspect of the invention.
Figure 6:
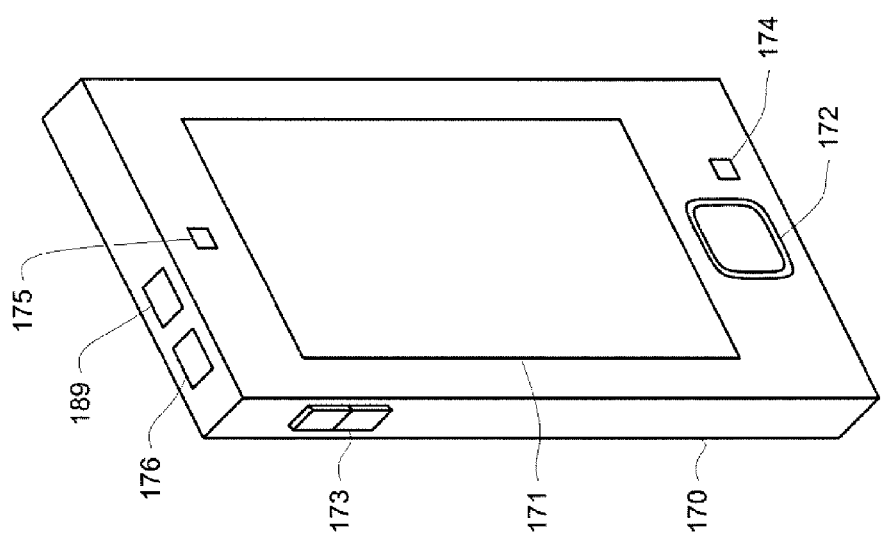
FIG. 6 is a pictorial diagram of the front of a device in accordance with an aspect of the invention.

One manner of expressing the geographic orientation of the client device 170 is shown in FIGS. 6-9. As shown in FIG. 6, the client device 170 may be a PDA/phone having a touch-screen display 171, general-purpose button 172, speaker 175, and microphone 174 on the front. The left side includes volume buttons 173. The top side includes a cell-phone antenna 176 and GPS receiver 189. As shown in FIG. 7, the back includes a camera 180. The camera may be oriented in a particular direction (hereafter, "camera angle").

Figure 8:
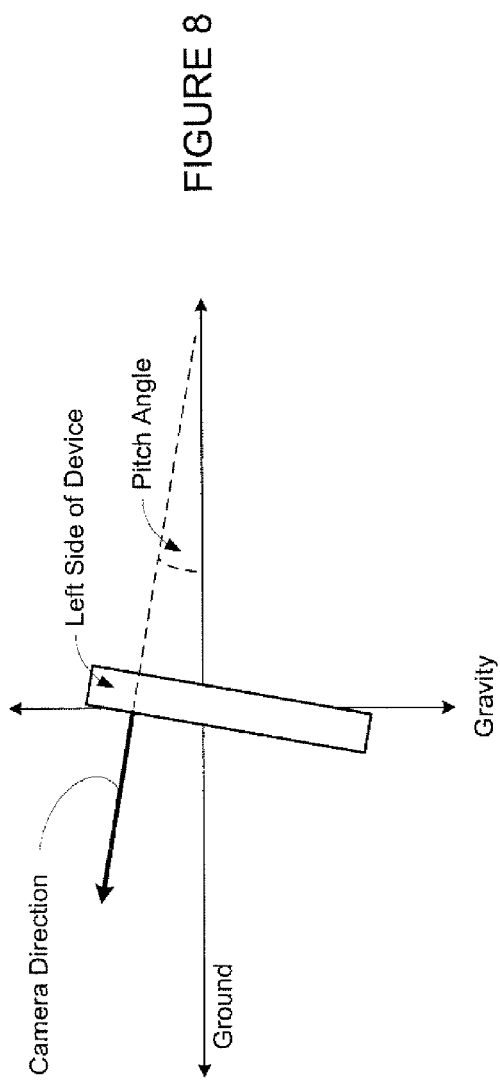
FIG. 8 is a diagram functionally illustrating, in accordance with an aspect of the invention, the orientation of a device relative to ground level.
Figure 9:
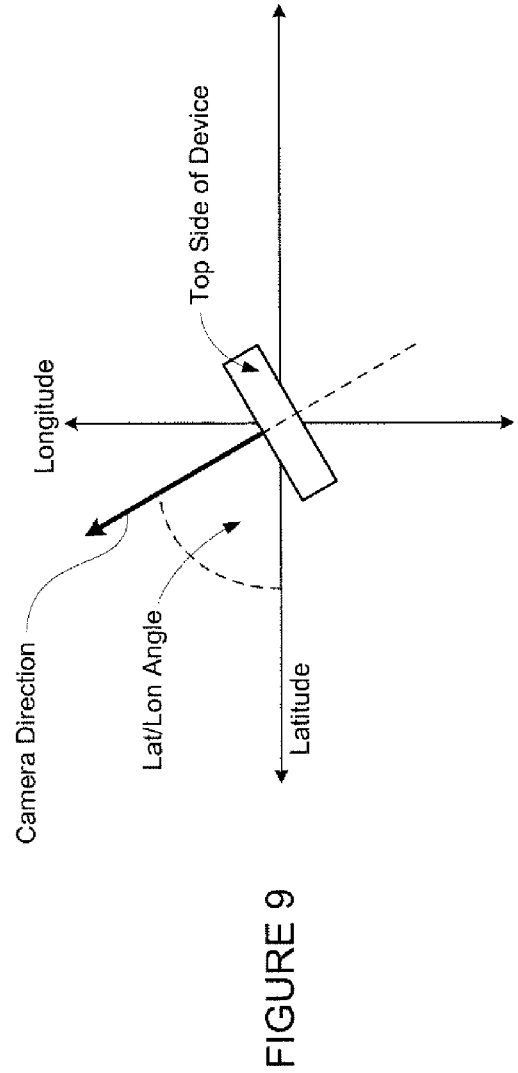
FIG. 9 is a diagram functionally illustrating, in accordance with an aspect of the invention, the orientation of a device relative to latitude and longitude.

The camera angle may be expressed in three-dimensions as shown by the compass rose in FIG. 7 and schematically in FIGS. 8 and 9. It shall be assumed for ease of understanding and not limitation that the camera angle is fixed relative to the orientation of the device. In that regard, FIG. 8 illustrates a potential pitch of the device (as seen looking towards the left side of the device) relative to the ground, e.g., relative to the plane perpendicular to the direction of gravity. FIG. 9 illustrates a potential latitude/longitude angle of the device (as seen looking down towards the top side of the device), e.g., the camera direction in which the camera points relative to the latitude and longitude. Collectively, the pitch and latitude/longitude angle define a camera angle in three-dimensions. These angles may be outputted as numerical values by the accelerometer 188, used by the device's processor, and stored in the memory of the device.

Figure 20:
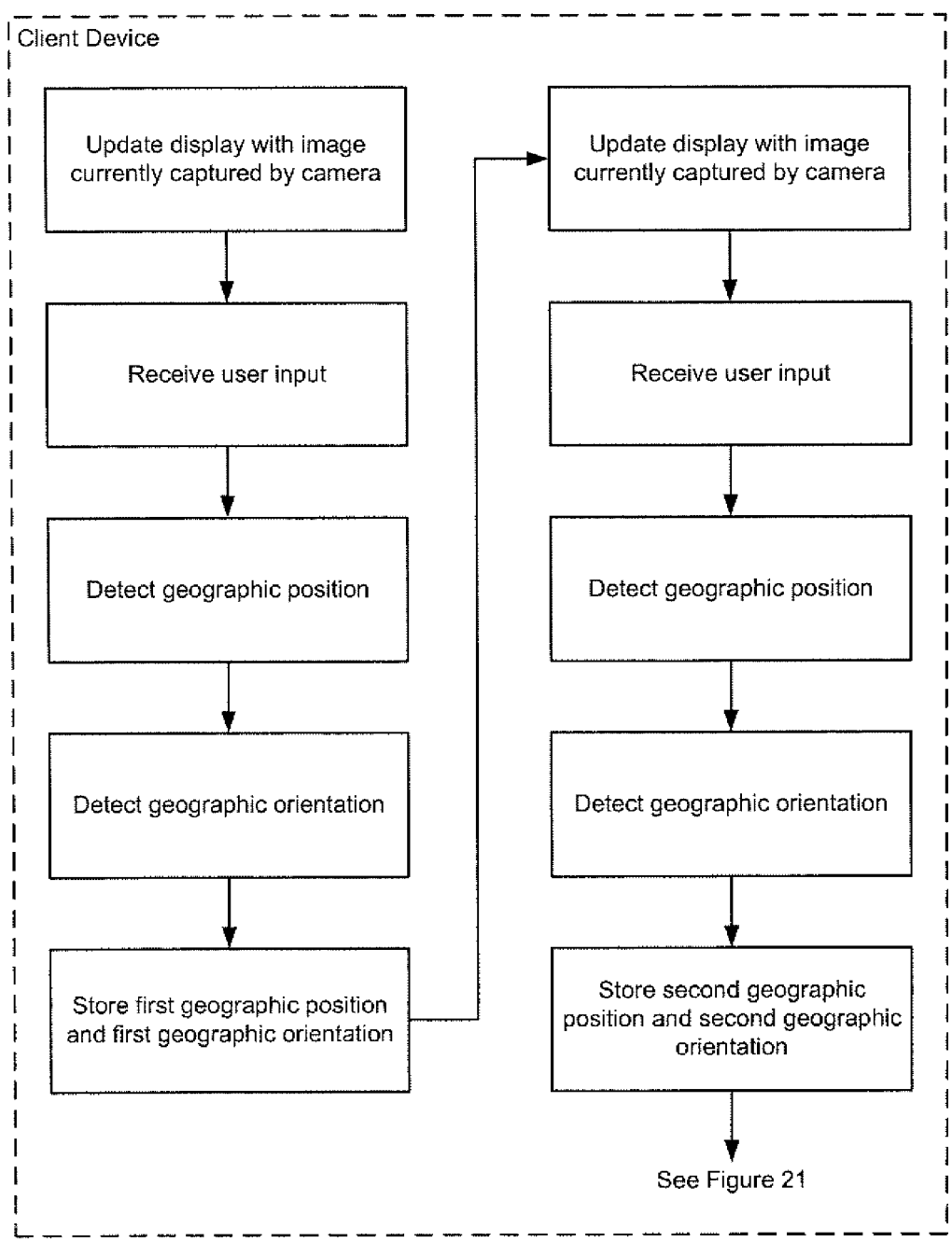
FIG. 20 is a flowchart in accordance with an aspect of the invention.
Figure 21:
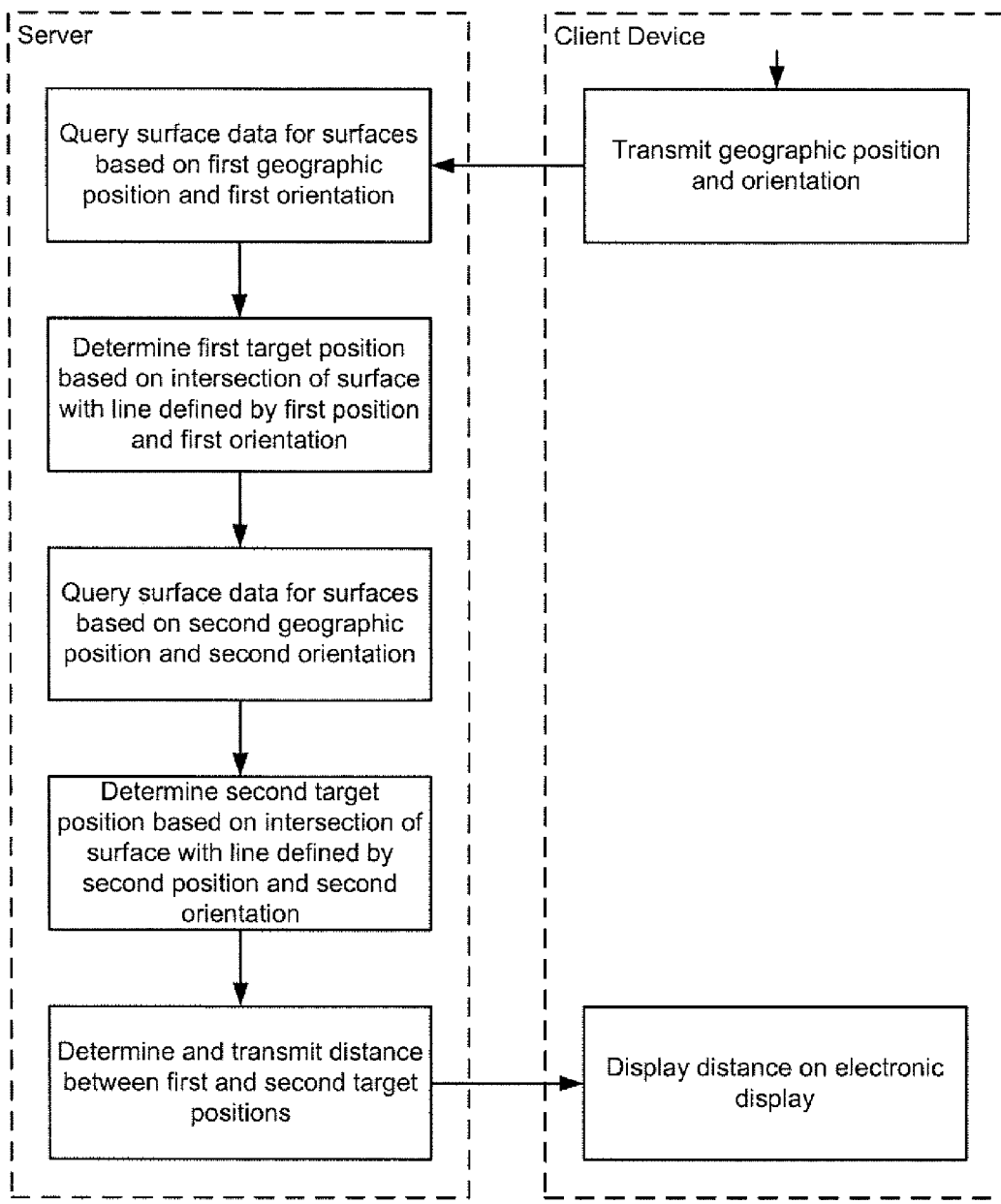
FIG. 21 is a flowchart in accordance with an aspect of the invention.

In addition to the operations illustrated in FIGS. 20-21, various operations in accordance with a variety of aspects of the invention will now be described. It should be understood that the following operations do not have to be performed in the precise order described below. Rather, various steps can be handled in reverse order or simultaneously.

Figure 10:
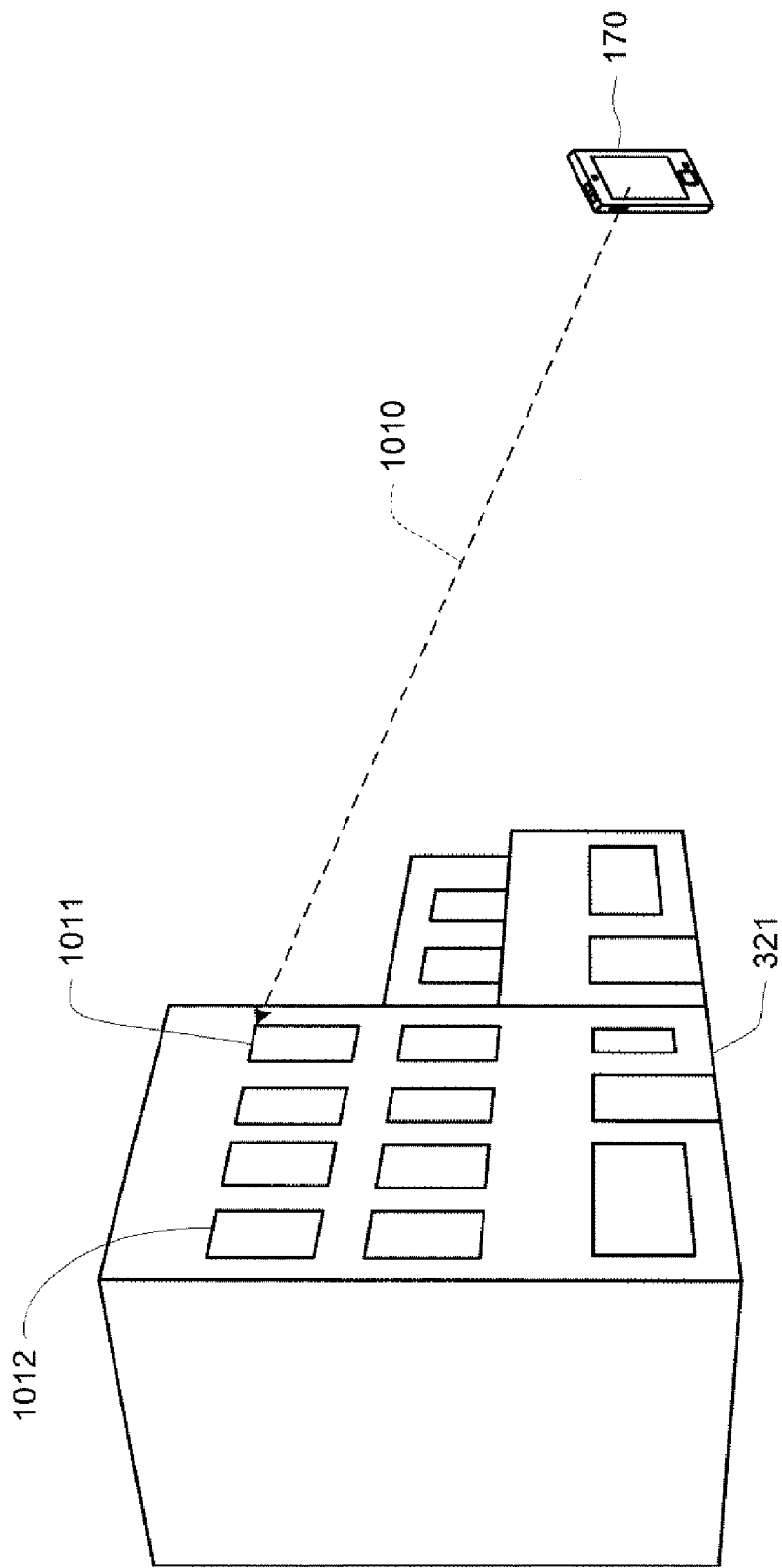
FIG. 10 is a diagram functionally illustrating, in accordance with an aspect of the invention, the orientation and position of a client device relative to a position on the surface of a geographic object.

In one aspect, a user may determine the distances between two different points on one or more geographic objects by orienting the client device at the points. In that regard, as shown in FIG. 10, the user may stand in front of building 321 and orient the phone 170 in a direction 1010 that points at the right-most window 1011 of building 321 if the user desires to measure a distance starting with the right-most window 1011.

Figure 11:
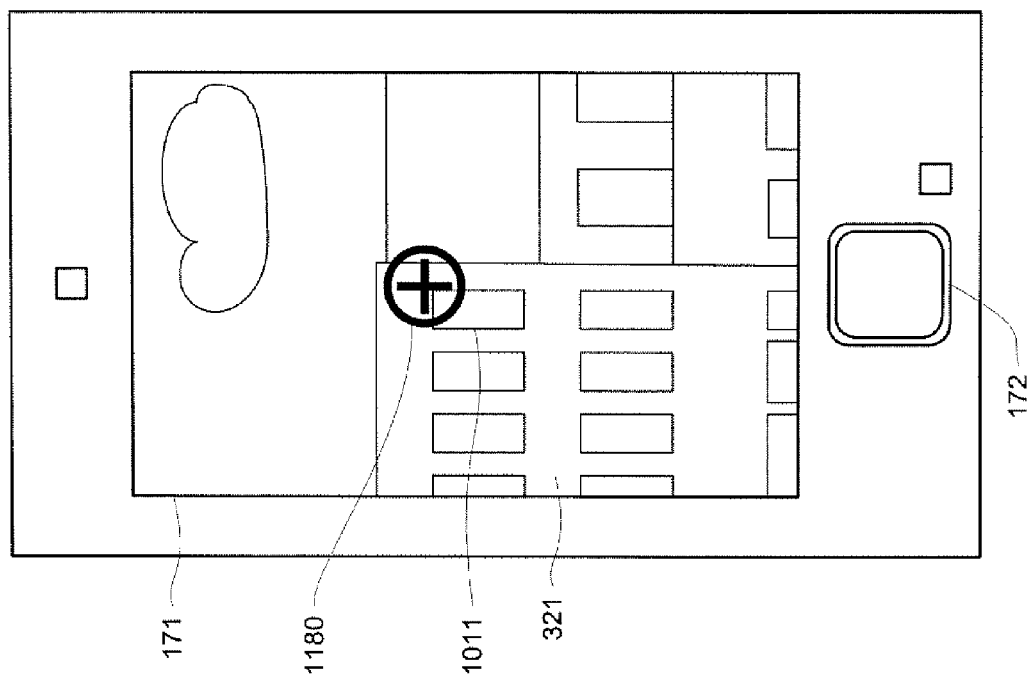
FIG. 11 illustrates a device and its display of information in accordance with an aspect of the invention.

The camera of the device may be used to help the user orient the phone at the desired position on the surface of a geographic object. For example, as shown in FIG. 11, the phone's processor may periodically update the display 171 so that it continuously shows the image currently captured by the camera 180. In that regard, the camera may show the building 321. It may also display a target 1180, bulls eye or some other indicator to indicate the exact or approximate position of the geographic object at which the camera device is pointed.

In one aspect, the user presses a button or provides some other indication that it has selected the first geographic position he or she wishes to measure (hereafter, the "first target"). For example, the user may depress button 172 when the target 1180 points at the right-most window 1011 of building 321.

The geographic position of the first target may be determined by the geographic position and orientation of the client device and the object position data associated with the targeted geographic object. For example, as shown in FIG. 1, when the user selects the first target, client device 170 may obtain its latitude/longitude/altitude position from GPS receiver 189 and its orientation from accelerometer 188. This information is transmitted by the client device 170 to server 110 along with a request for the geographic position of the target. The server 110, in turn, may query object position data 260 for surfaces that are proximate to the client device's position and facing the device's position.

Figure 12:
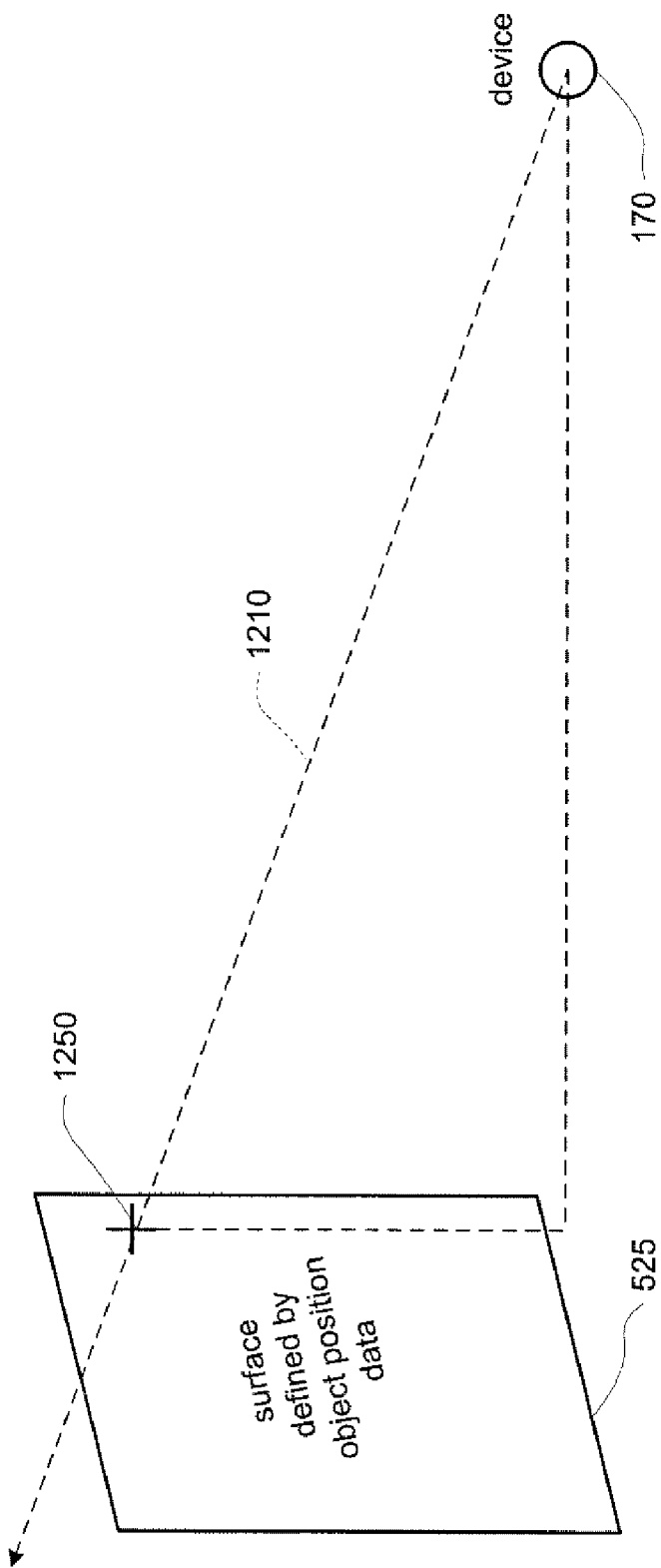
FIG. 12 is a diagram functionally illustrating the calculation of a position on the surface of a geographic object in accordance with an aspect of the invention.

As shown in FIG. 12, the geographic position of the target may be determined based on the device's geographic position and orientation as well as the geographic position of the targeted geographic object. For example, the line 1210 from device 170 to the target position 1250 may be described by both the device's position (which may be represented by the device's altitude relative to the ground and its latitude/longitude position) and orientation (which may be represented by the pitch angle relative to the ground and an angle relative to latitude/longitude). In the regard, the line may also be considered a vector. The surface plane 525 of the targeted geographic object may be described by its object position data (e.g., as noted above, the plane may be defined by the position of the vertices, which are each in turn represented by their altitude relative to the ground and their latitude/longitude position). Using techniques such as analytic geometry and ray tracing, the intersection of the line and plane may be computed by the server's processor, with the result representing the geographic position of the target 1250. If multiple surfaces within the object position data would be intersected by the line, the surface closest to the device may be selected.

The server may then provide the resulting geographic position of the first target to the client device.

Figure 13:
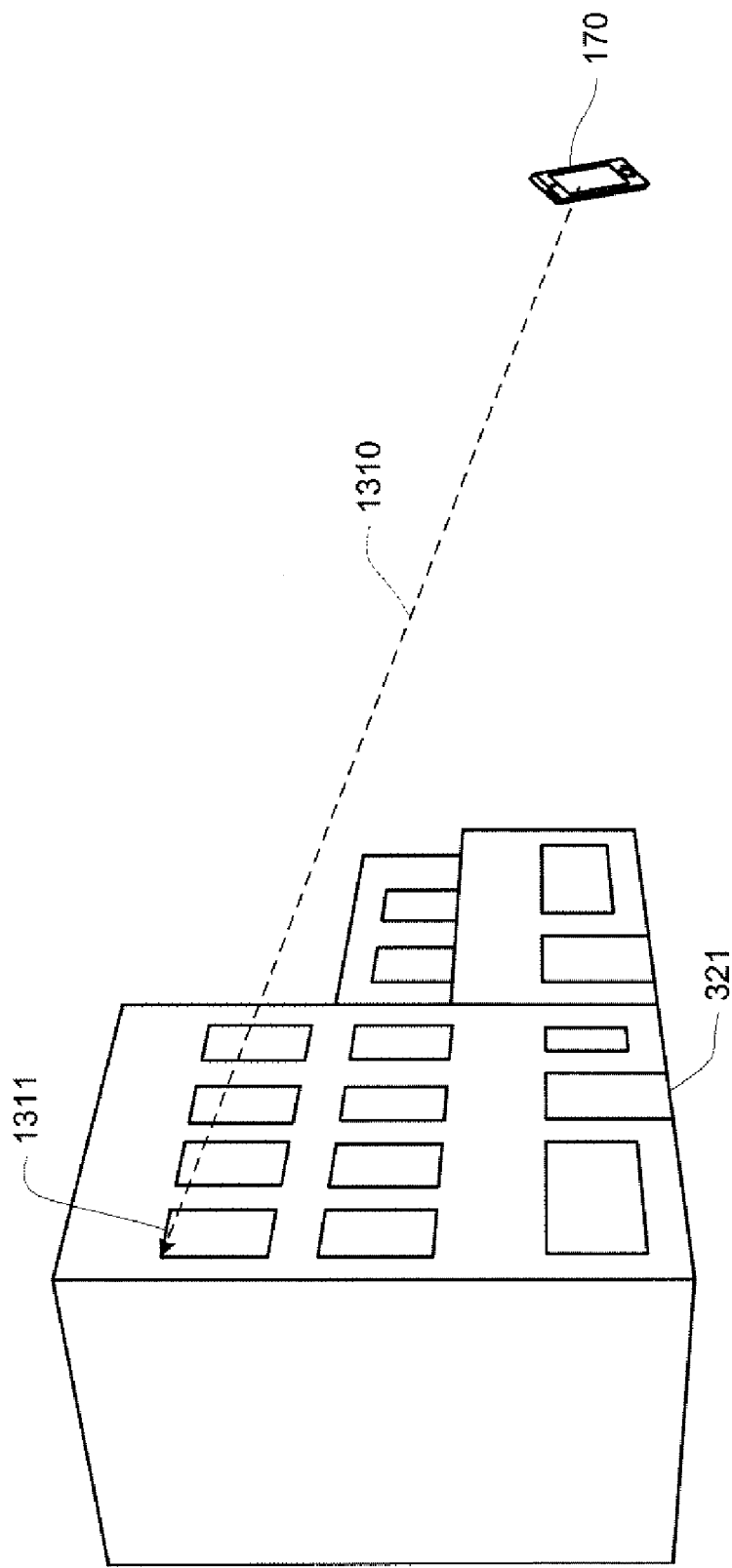
FIG. 13 is a diagram functionally illustrating, in accordance with an aspect of the invention, the orientation and position of a client device relative to a position on the surface of a geographic object.
Figure 14:
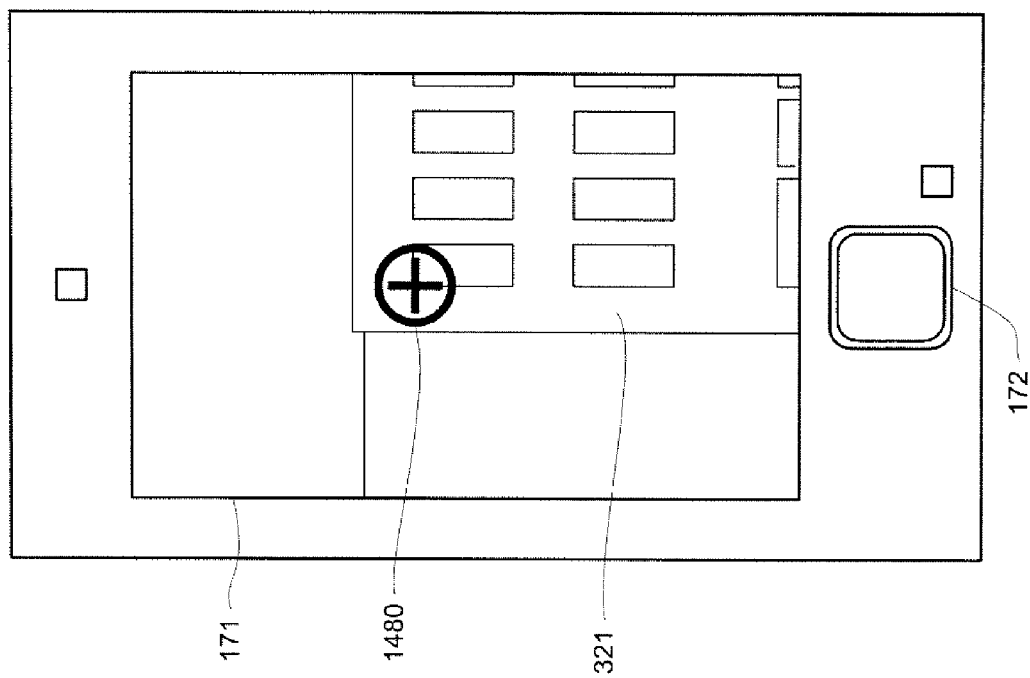
FIG. 14 illustrates a device and its display of information in accordance with an aspect of the invention.

The user may then select another target. For example, as shown in FIG. 13, the user may stand in front of building 321 and orient the phone 170 in a direction 1310 that points at the left-most window 1311 of building 321. As before, the camera of the device may be used to help the user orient the phone at the desired position on the surface of a geographic object. For example, as shown in FIG. 14, the phone's processor may display the image currently captured by the camera on the display 171 such as building 321. It may also display a target 1480, bulls eye or some other indicator to indicate the exact or approximate position of the geographic object at which the camera device is pointed. The user may select the second target via some user input, such as depressing button 172.

Figure 15:
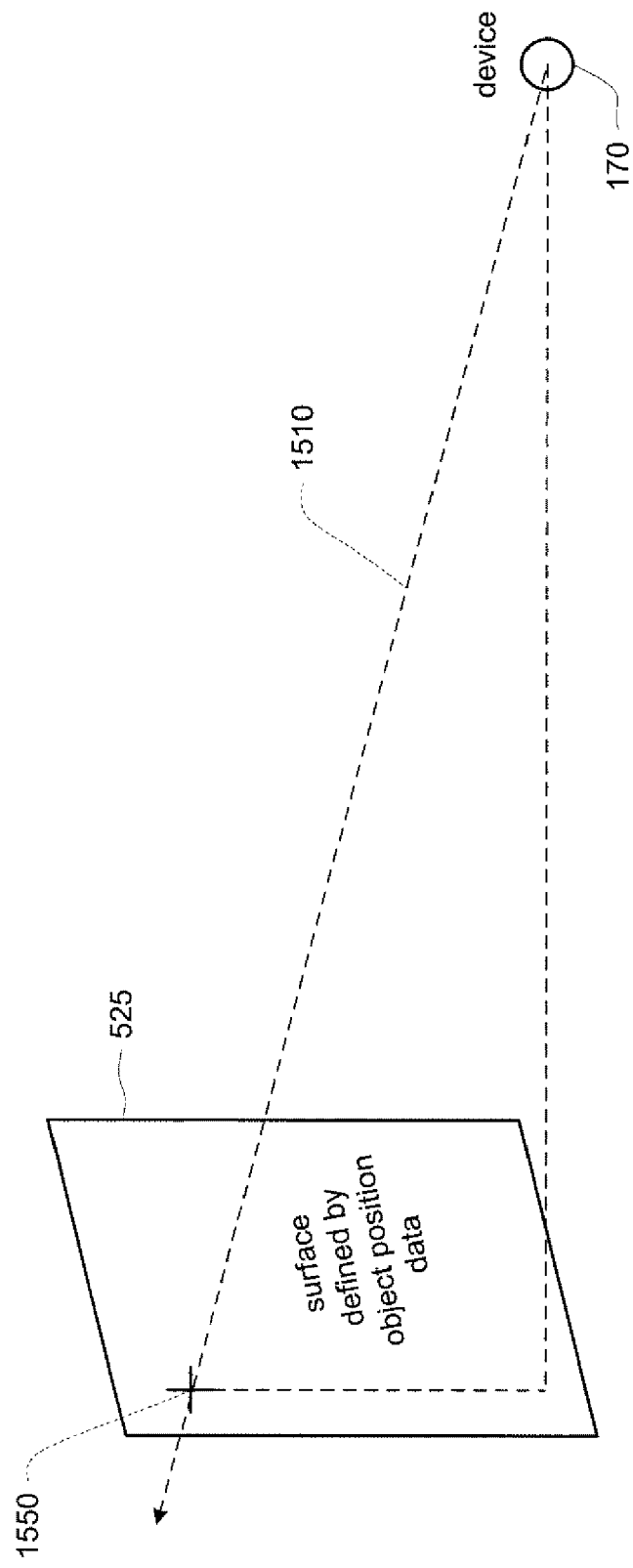
FIG. 15 is a diagram functionally illustrating, in accordance with an aspect of the invention, the calculation of a position on the surface of a geographic object.

The geographic position of the second target may be determined similarly to the first target. For example, as shown in FIG. 15, the line 1510 from device 170 to the target position 1550 may be described by both the camera angle and device position. The surface plane 525 of the targeted geographic object may be described by its object position data. Although the example of FIG. 15 has both targets on the same geographic surface 525, it will be understood that the second target could be on a different geographic object.

The server 110 may provide the resulting geographic position of the second geographic target to the client device as well.

Figure 16:
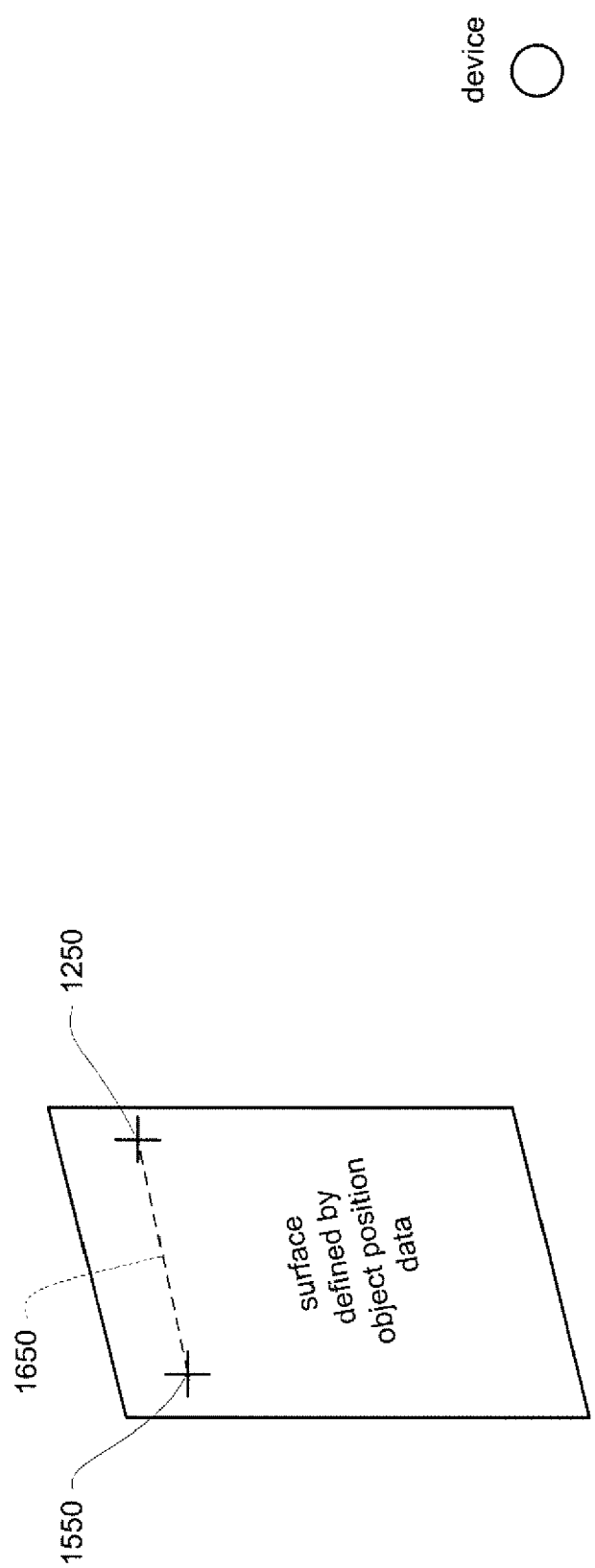
FIG. 16 is a diagram functionally illustrating, in accordance with an aspect of the invention, the calculation of the distance between positions on the surface of a geographic object.

The distance between the two targets may then be calculated. For example, as shown in FIG. 16, the distance between the first geographic position 1250 and second geographic position 1260 may be calculated based on their geographic coordinates. The distance may be calculated by converting the difference between the respective latitudes into meters, the difference between the respective latitudes into meters, the difference between the altitudes, and then taking the square root of the sum of the squares of the differences. The server may then provide the result to the client device.

Figure 17:
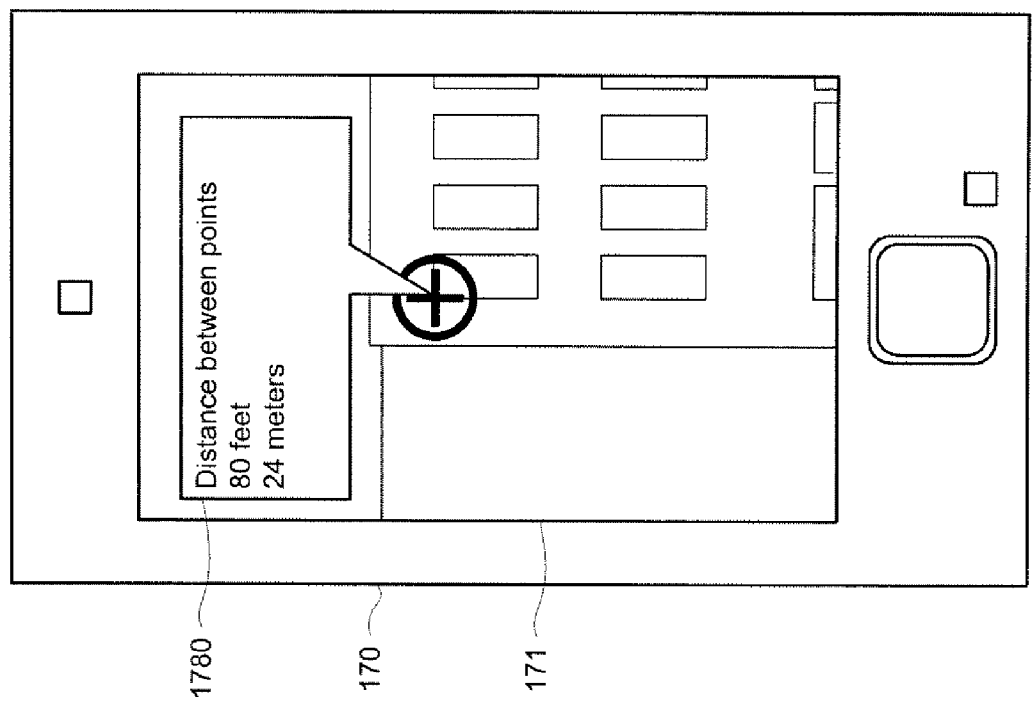
FIG. 17 illustrates a device and its display of information in accordance with an aspect of the invention.
Figure 18:
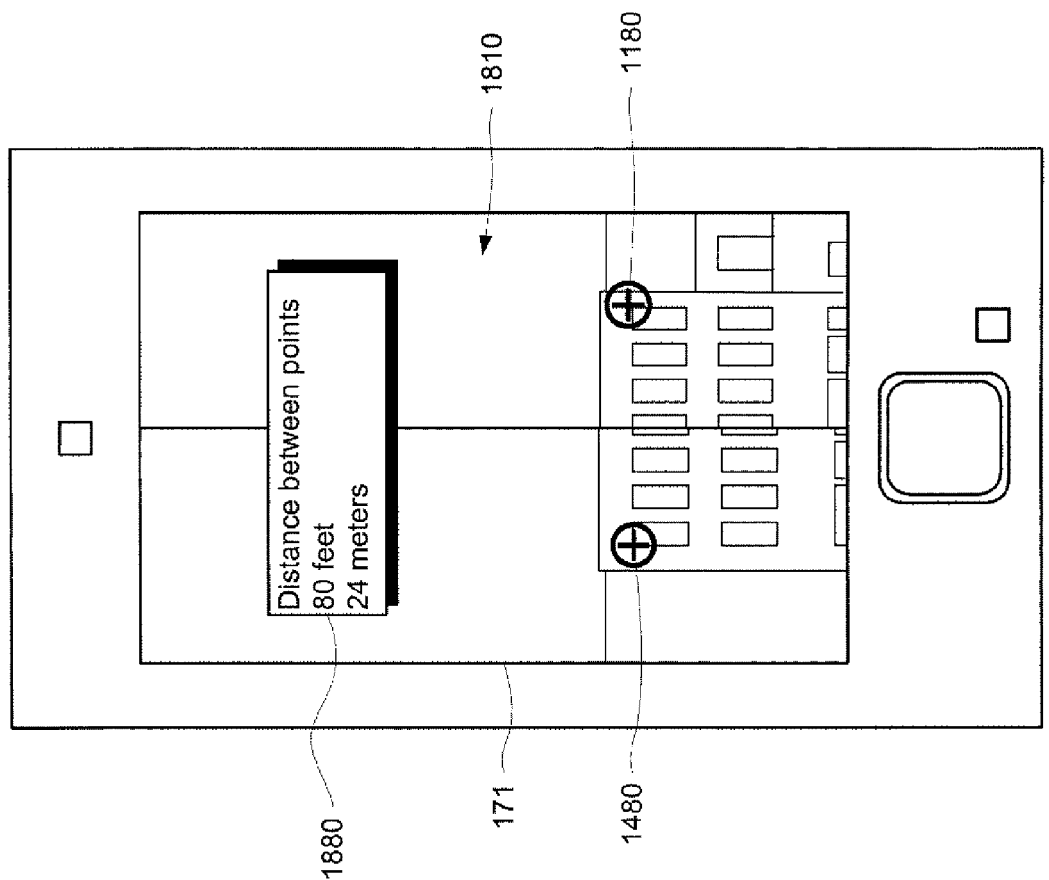
FIG. 18 illustrates a device and its display of information in accordance with an aspect of the invention.

The distance may be displayed to the user. For example, as shown in FIG. 17, the processor of client device 170 may cause display 171 to display a message 1780 that indicates the distance between the first and second target. As shown in FIG. 18, the display 171 may also show the location of both the first 1180 and second target 1480 on photographs 1810, 1820 of the geographic objects (such photos being taken when the user selected the first and second target 1180, 1480).

Figure 19:
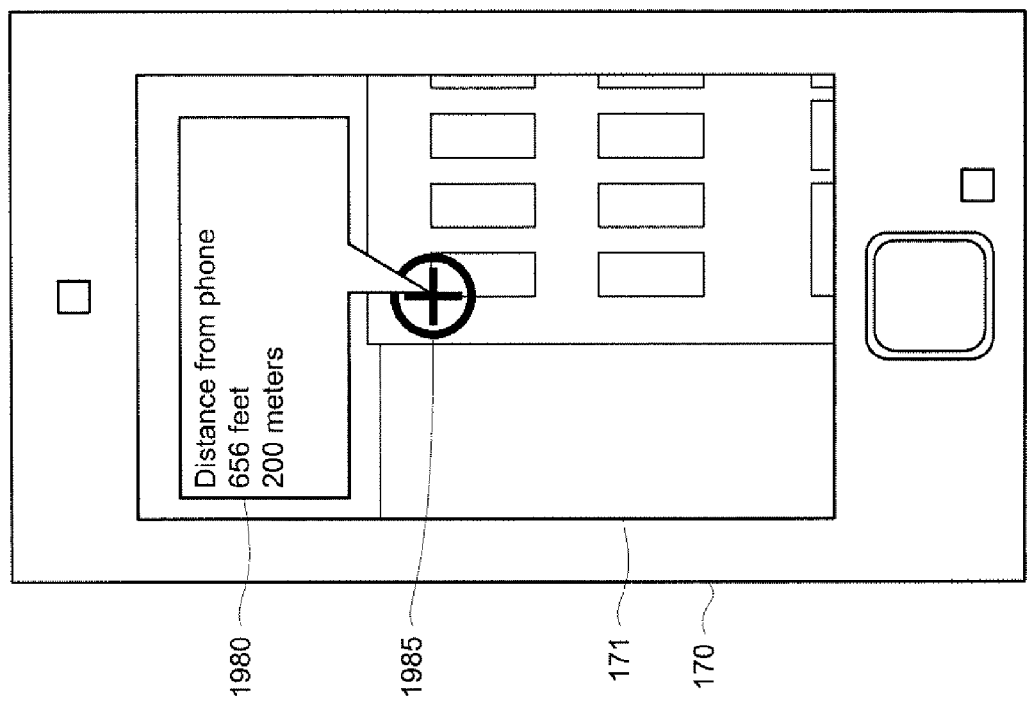
FIG. 19 illustrates a device and its display of information in accordance with an aspect of the invention.

In another aspect, the system and method determines the distance from the client device to the geographic object rather than between different points on different geographic objects. For example, as shown in FIG. 19, client device 170 may display a message 1980 showing the distance from the client device to the target position 1985. The distance may be computed in a manner to that similarly described above, except that the camera's geographic position would be used to compute the distance in lieu of another target.

In another aspect, the client device retrieves and displays a portion of the street level image corresponding with the determined geographic position. This allows the user to visually compare the position on the street level image with the position on the image captured by the phone in order to confirm that the position was correctly determined.

In yet another aspect of the invention, the client device will perform some or all of the calculations. For example, the client device may download the object position data and compute the geographic position of the targets and the relevant distances using its own processor, rather than sending the information to the server.

In that regard, the server may send a three-dimensional model of the surfaces of the geographic objects in the nearby area based on the current location of the client device. In response, the client device may be used to measure and display the distance between any two points based on the three-dimensional model without generating further requests to the server. In certain circumstances, this may both reduce the network communication between the server and client device and enable the user to continue to interactively measuring distances.

Indeed, while there are advantages to obtaining the object position data by querying the server based on the client device's current position, the client device may pre-store object position data instead.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method of determining distances with a device comprising:
   receiving object position data representing the position of a surface of a geographic object;
   determining a first and second geographic position of the device;
   determining a first and second geographic orientation of the device;
   determining, with a processor, the distance between a first and second position on the surface of the geographic object based on the first geographic position of the device, the second geographic position of the device, the first geographic orientation of the device, the second geographic orientation of the device and the object position data; and
   wherein the device is a wireless phone and the object position data is wirelessly received by the phone.

2. The method of claim 1 wherein the first and second geographic positions of the device are determined with a GPS component.

3. The method of claim 1 wherein the first and second geographic orientations are determined with an accelerometer.

4. The method of claim 1 wherein the first position is determined by determining the position of the surface, as represented by the object position data, that is intersected by a vector extending from the first geographic position of the device at an angle equal to the first geographic orientation.

5. The method of claim 1 wherein the second position is determined by determining the position of the surface, as represented by the object position data, that is intersected by a vector extending from the second geographic position of the device at an angle equal to the second geographic orientation.

6. The method of claim 1 further comprising displaying, on an electronic display, the distance.

7. The method of claim 1 further comprising capturing, with a camera, an image of the surface of the geographic object and displaying the image on an electronic display.

8. The method of claim 7 further comprising displaying, on the displayed image, an indication of the first position on the surface relative to the image.

9. A method of using a wireless phone to determine distances comprising:
   receiving first and second position values representative of the geographic position of the wireless phone;
   receiving first and second orientation values representative of the geographic orientation of the wireless phone;
   receiving object position data from a server, where the object position data represents the geographic position of a plurality of points on the surface of a geographic object;
   determining with a processor, first and second geographic positions on the surface such that the first and second geographic positions corresponds with the intersection of the surface with the first and second lines defined by the first and second positions and the first and second geographic orientations, respectively;
   determining with a processor, the distance between the first and second geographic positions on the surface; and
   displaying, on an electronic display on the wireless phone, the distance.

10. The method of claim 9 further comprising:
    receiving the first position value and first orientation value in response to a user activating a button on the wireless phone at a first point in time; and
    receiving the second position value and second orientation value in response to a user activating a button on the wireless phone at a second point in time after the first point in time.

11. The method of claim 10 further comprising:
    periodically capturing images with a camera contained in the wireless phone; and
    displaying the capture images with an indication of the portion of the image that corresponds with the orientation of the camera.

* * * * *